Aug. 26, 1969     D. FAHEY     3,463,727
TREATMENT OF MATERIALS HAVING BOTH LIQUID AND SOLID CONTENTS
Filed July 18, 1967     3 Sheets-Sheet 1

Inventor
DENIS FAHEY
By Imirie & Smiley
Attorneys

Inventor
DENIS FAHEY
By Jamieson & Smiley
Attorneys

United States Patent Office 3,463,727
Patented Aug. 26, 1969

3,463,727
TREATMENT OF MATERIALS HAVING BOTH LIQUID AND SOLID CONTENTS
Denis Fahey, 8 Montfat Place, Newcastle, Staffordshire, England
Filed July 18, 1967, Ser. No. 654,191
Claims priority, application Great Britain, July 22, 1966, 33,001/66
Int. Cl. B01d 35/20
U.S. Cl. 210—19                9 Claims

ABSTRACT OF THE DISCLOSURE

The liquid and solid material is fed on to a filtering element having meshes through which the liquid passes, and the filtering element is subjected to a vibratory motion of such a nature that the solid materials retained on it are caused to travel across the element towards a peripheral discharge aperture leading to a spiral channel down which the material progresses assisted by the vibratory action.

Brief summary of the invention

A resiliently mounted filtering element is horizontally disposed and subjected to a rotational vibration having upward and downward components in the movement, provision being made below the element for the discharge of liquid passing through the element and provision being made at the side of the element for the discharge of intercepted material to a downwardly extending spiral channel.

This invention relates to the treatment of materials having both liquid and solid contents; it is suitable for use in filtration and washing treatments, for instance in the de-watering of slurries, the straining or screening of liquids, or the washing of solid materials for the removal of impurities.

Typical methods of carrying out such treatments at present in use include the use of filter presses and centrifuges and the present invention is intended to provide alternative methods and means for such purposes.

The invention consists in feeding the material on to a filtering element having meshes through which the liquid passes and subjecting the filtering element to vibratory action of such a nature that solids retained upon the filtering element are caused to travel across the element towards an aperture through which they are discharged.

Preferably the material is caused to pass to a discharge point at or near the periphery of the filtering element and is then caused to progress round an annular or spiral path, preferably downwards, towards a delivery point.

The vibratory action is preferably a three-dimensional motion of a rotational character with an upward and downward component in the movement.

The material may be delivered first on to a lower filtering element through which the liquid passes, the solids being caused to travel across the filtering element and being discharged separately from the liquid, after which they are treated to washing action and are then delivered along with the washing liquor on to an upper filtering element, through which the washing liquor passes, while the washed solids retained on the upper filtering element are caused to progress across that element to the discharge point.

The invention also consists in apparatus comprising a resiliently supported filtering element, means for subjecting the filtering element to a vibratory movement, and an outlet through which is discharged solid material retained upon the filtering element and caused to travel across it towards the outlet by the vibratory movement.

An annular channel is preferably provided around which solid material will pass after discharge from the filtering element, the channel being of a downwardly extending spiral form; the channel may also be of a perforated or mesh construction.

A discharge chute may be provided below the filtering element to receive the liquid passing through the element.

The vibratory movement is preferably created by vibrator means situated below the filtering element acting to create a rotational vibration having upward and downward components in the movement.

There may be more than one filtering element, for example an additional filtering element may be arranged below the one aforesaid, with means for delivering primary material on to the lower element, means for discharging intercepted solids at the side of the lower element to washing plant, and means for delivering washed solids and washing liquor on to the upper filtering element.

The filtering element, or each of them, is preferably provided with a guide member arranged to guide the retained solid material across the element towards the delivery outlet; the guide member is preferably of scroll-like form.

Constructional forms of the invention will now be described with reference to the accompanying drawings in which.

Figure 1:
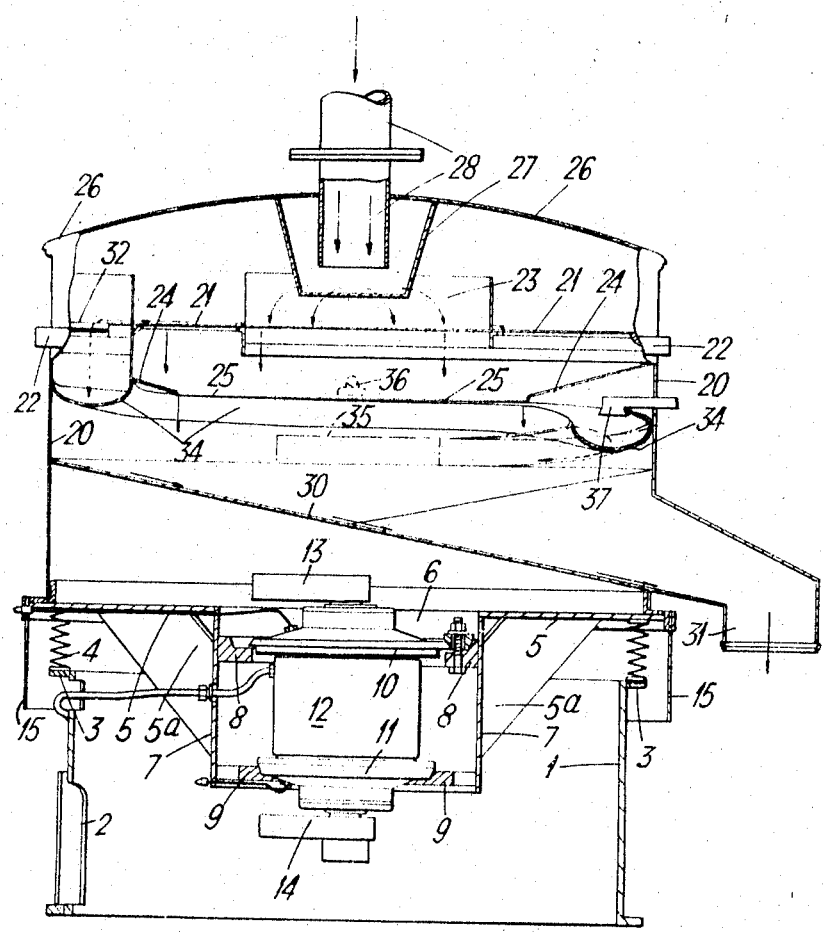
FIGURE 1 is a vertical section through a filter apparatus.
Figure 2:
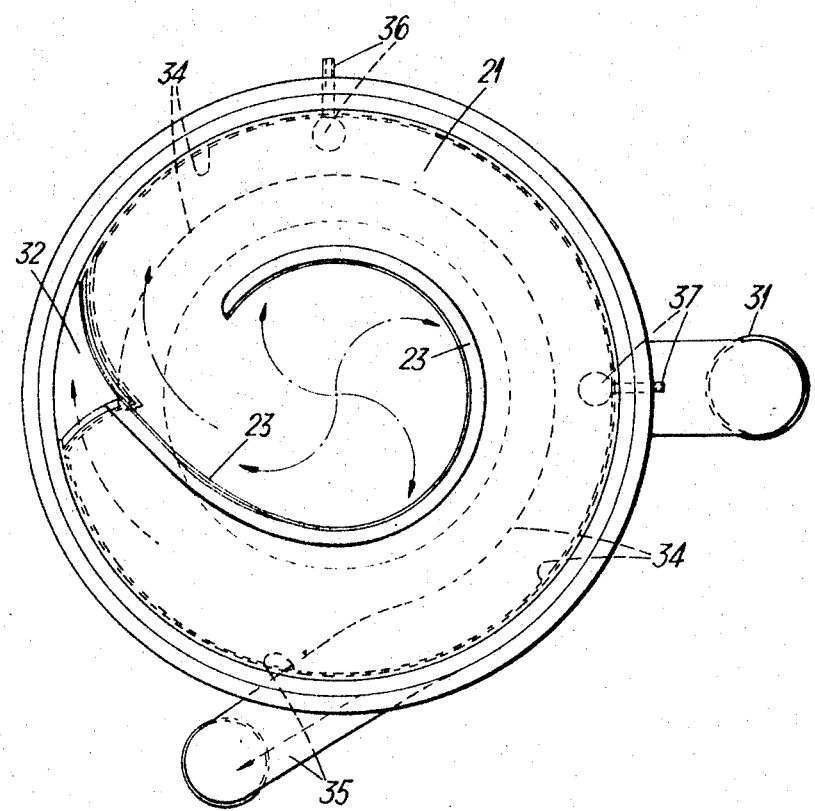
FIGURE 2 is a plan thereof with a top cover removed.

Referring to FIGURES 1 and 2 the apparatus comprises a base 1 of a generally cylindrical shape with an aperture 2 at one side. The base has an encircling horizontal flange 3 at the top on which are located a number of vertical coil springs 4 forming an annular series, whose upper ends are connected to a horizontal plate 5 having stiffening gussets 5a and a central aperture 6 and a centrally depending cylindrical sleeve 7. The sleeve has attached to its inside wall upper and lower mounting brackets or ledges 8, 9, on which upper and lower mounting plates 10, 11, are supported; the mounting plates 10, 11 carry an electric motor 12, the axis of the motor spindle being vertical and on the vertical centre line of the machine. The spindle carries upper and lower weights 13, 14, adjustable radially so that they can be set out of balance to create the desired vibratory motion of the plate 5 and the superstructure which it carries, resting on the springs 4. The springs are protected by a rubber or other skirt 15 depending from the periphery of the plate 5. The rotating out-of-balance masses represented by the weights 13, 14 set up a vibratory motion of a rotational character with an upward and downward component in the movement, which is of high frequency and low amplitude.

The plate 5 carries an upwardly extending cylindrical housing 20 across the upper part of which a flat circular filtering element in the form of a deck 21 of mesh material is tightly secured in a horizontal position in clamping rings 22. On the deck 21 a guide member illustrated as a spiral scroll 23 is mounted, the convolution of the spiral in conjunction with the type of vibratory motion imparted to the deck 21, constraining material supported on the deck to move in a spiral progression outwards towards the periphery. Below the deck 21 is a distribution tray 24 having a central aperture 25. Above the deck 21 the housing 20 has a cover 26 in which there is a central perforated hopper 27 which acts as a baffle to break the initial velocity of the incoming slurry or suspension which is fed in by way of a central downwardly extending feed inlet 28. The perforated hopper 27 reduces splashing and prevents solid particles from being forced through the meshes of the deck 21, so that wear on the deck is reduced. The liquid is permitted to pass through the meshes, where it falls through aperture 25 in the tray 24 and is received by a discharge chute 30 leading to a liquid discharge spout 31. The solid matter intercepted by the deck 21 forms into a spiral rope on the deck, under the influence of the vibratory movement and the scroll 23, and it progresses towards an area at the periphery of the deck where there is an aperture 32 through which the solid material falls on to a spiral channel 34 leading to a discharge outlet 35. The channel 34 is composed preferably of perforated sheet material covered with mesh material; an inlet 36 is provided to spray the solid material with wash-liquor while it travels round the channel 34 to free it from residual liquid adherent. It may also be subjected to the drying action of hot air through an inlet nozzle 37. The channel 34 has a downward gradient, which further assists the vibratory action in effecting the progress of the material, but this is not essential, as the vibration will effect travel of the material either round a horizontal channel or round a spiral channel with an upward gradient. In the drawings the directions of travel of the materials are indicated by arrows; the liquid is indicated by solid line arrows, the filtered solids by dotted line arrows, and the slurry or incoming mixture of liquid and solid matter by chain-dotted line arrows.

Figure 3:
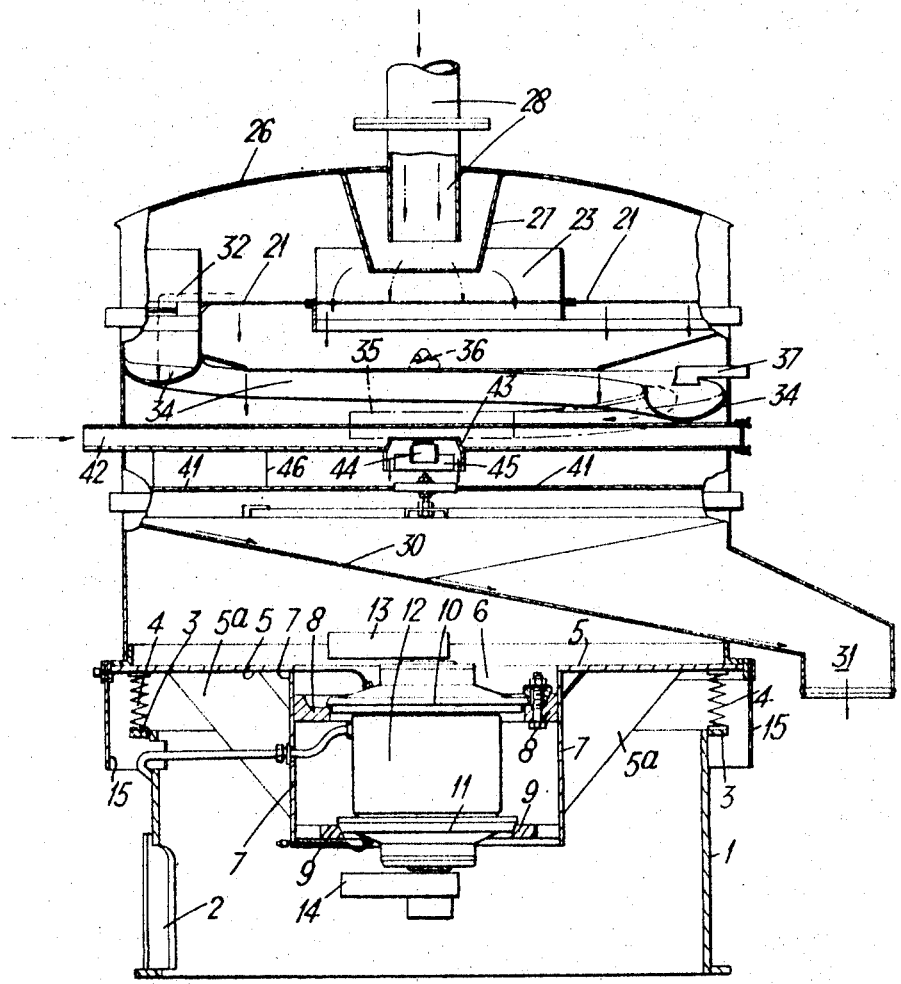
FIGURE 3 is a similar view to FIGURE 1 showing an alternative arrangement.

Referring to FIGURE 3 the upper part of the apparatus, including the deck 21 and channel 34, and also the lower part including the base 1, springs 4, and vibratory units 10, 11, 12, 13, 14, are similar to the parts shown in FIGURES 1 and 2. In some cases, however, it may be desired to use more than one deck, suitably spaced, one above another, and FIGURE 3 shows an apparatus having a lower deck 41. The mother slurry is delivered by a primary feed pipe 42 to a centrally disposed deflector unit comprising a housing 43 enclosing a bell 44 mounted over a tray 45, so that the material is deflected by the bell into the tray 45 and overflows the rim of the tray on to the deck 41. The liquid falls through the deck on to a discharge chute 30 leading to a discharge spout 31. The primary filtered solids travel across the deck 41 in a spiral progression to an outlet 46 (similar to the outlet 35, FIGURES 1 and 2) in the wall of the housing where they are discharged through a spout or pipe leading to a tank where they are washed and the undesirable liquor which has attached itself to the solids is diluted. The secondary slurry composed of the wash liquor and the primary filtered solids is then pumped back from the tank to the top feed inlet 28 and the subsequent treatment of the solids is similar to that already described with reference to FIGURES 1 and 2, by way of a deck 21, scroll 23 channel 34 and outlet 35. The washing liquor passes through the deck 21 and gives a primary washing to the material on the lower deck 41. After losing the liquor on the top deck the solids may be further spray-washed and dried in their progress round the channel 34 as already described.

The liquid discharge chute 30 and spout 31 are arranged beneath the lower deck 41.

In some cases it may be desired to employ vacuum or pressure to assist the operations. It would be possible for instance to provide a connection to a source of suction below the deck or decks as the case may be, and to pressurise the space above the deck or decks.

I claim:

1. A method for washing, filtration and similar treatment of materials having both liquid and solid contents, comprising the steps of feeding the material on to a filtering element, allowing liquid to pass through the filtering element and discharging it below the filtering element, retaining solid material on the filtering element, subjecting the filtering element to vibratory motion and thereby causing the solid material retained on the element to move progressively across the element to a discharge point near the periphery of the element, constraining the material to move in a downwardly extending spiral path after its passage from the discharge point, and subjecting the material to further treatment during its movement.

2. A method as claimed in claim 1 in which the vibratory motion is a rotational vibration having upward and downward components in the movement.

3. A method as claimed in claim 1 in which the further treatment to which the material is subjected during its spiral movement after leaving the filtering element under the vibratory motion is one at least of the steps of additional filtration, spraying with wash liquor and drying by means of hot air.

4. A method as claimed in claim 1 including the preliminary steps of first delivering the material on to a lower filtering element also subjected to the vibratory motion, discharging liquid and solid separately after filtration on the lower element, subjecting the solids to washing action, and then delivering the said solids with wash liquor on to the upper first-mentioned filtering element.

5. Apparatus for washing, filtration and similar treatment of materials having liquid and solid contents comprising a horizontally disposed filtering element, means for resiliently supporting the filtering element, means for subjecting the filtering element to a vibratory motion of a rotational character having an upward and downward component in the movement, an outlet near the periphery of the filtering element towards which the material retained upon the filtering element is caused to move progressively under the vibratory motion, a channel spirally disposed and extending in a downward direction peripherally of the filtering element and positioned to receive retained material from the filtering element, said channel being also subjected to the vibratory motion, so that thereby the progress of the material along the channel is assisted.

6. Apparatus as claimed in claim 5 having guide means associated with the filtering element and shaped to guide the retained material across the element in a predetermined path towards the outlet therefrom.

7. Apparatus as claimed in claim 5 in which the spiral channel is of a perforated construction and has means for spraying liquid into it to wash material passing along it.

8. Apparatus as claimed in claim 7 having also means associated with the spiral channel for subjecting material passing along it to the drying action of hot air.

9. Apparatus as claimed in claim 5 having also a further filtering element mounted below the first-mentioned one, and also subjected to the vibratory motion, means associated with the further filtering element for delivering primary material on to it, an outlet for solid material retained by the further filtering element, and means for delivering said retained material with wash liquor on to the upper filtering element, by which the washed solid material will be retained upon the upper filtering element and progress under the vibratory motion towards the outlet therefrom and thence to the spiral channel, while the wash liquor will pass through the filtering element for discharge.

References Cited

UNITED STATES PATENTS

| | | | |
|---|---|---|---|
| 2,658,609 | 11/1953 | Weyandt | 210—388 X |
| 3,047,151 | 7/1962 | Hurst | 209—332 X |
| 3,218,313 | 11/1965 | Blankenship | 210—68 X |
| 3,327,401 | 6/1967 | Stamos et al. | 210—19 X |

SAMIH N. ZAHARNA, Primary Examiner

U.S. Cl. X.R.

209—257, 326; 210—68, 77, 389